United States Patent
Domingues et al.

(10) Patent No.: US 10,624,356 B2
(45) Date of Patent: Apr. 21, 2020

(54) REFRIGERATED DOUGH WITH EXTENDED SHELF LIFE MADE FROM WHITE WHEAT FLOUR

(71) Applicant: General Mills, Inc., Minneapolis, MN (US)

(72) Inventors: David J Domingues, Plymouth, MN (US); Elliot Augst, Minneapolis, MN (US); Craig A Dowd, Eagan, MN (US); Patrick C Dreese, Plymouth, MN (US); David H Katzke, Shoreview, MN (US); James P Michaels, Blaine, MN (US); Thorne R Seese, Somerset, WI (US)

(73) Assignee: General Mills, Inc., Minneapolis, MN (US)

( * ) Notice: Subject to any disclaimer, the term of this patent is extended or adjusted under 35 U.S.C. 154(b) by 862 days.

(21) Appl. No.: 15/074,643

(22) Filed: Mar. 18, 2016

(65) Prior Publication Data

US 2017/0265484 A1    Sep. 21, 2017

(51) Int. Cl.
*A21D 10/00* (2006.01)
*A21D 2/26* (2006.01)
(Continued)

(52) U.S. Cl.
CPC ............. *A21D 10/005* (2013.01); *A21D 2/00* (2013.01); *A21D 2/185* (2013.01); *A21D 2/26* (2013.01);
(Continued)

(58) Field of Classification Search
CPC ........ A21D 2/26; A21D 6/003; A21D 10/025; A21D 2/00; A21D 2/185; A21D 15/02
See application file for complete search history.

(56) References Cited

U.S. PATENT DOCUMENTS 3,001,727 A    9/1961  Block et al.
3,974,298 A    8/1976  Cauvain et al.
(Continued)

OTHER PUBLICATIONS

Rose et al., "Enhanced Lipid Stability in Whole Wheat Flour by Lipase Inactivation and Antioxidant Retention", Cereal Chemistry, AAC International Inc., vol. 85, No. 2, pp. 218-223, Mar. 1, 2008.

*Primary Examiner* — Subbalakshmi Prakash
(74) *Attorney, Agent, or Firm* — Diederiks & Whitelaw, PLC; John L. Crimmins, Esq.

(57) ABSTRACT

A white wheat flour is made from a combination of a first flour stream including at least a non-heat treated low ash and low bran flour stream, and a second flour stream including a heat-treated high ash and high bran flour stream. The white wheat flour preferably exhibits an extensibility in the range of 160-180 for use in making raw dough used in sheeted dough manufacturing systems. Importantly, the specified processing of the invention only results in a change in extensibility of less than 20%. The raw dough composition can be packaged and stored in a refrigerated condition for subsequent use in making biscuits, rolls, croissants or the like. By heating the second flour stream, enzymes in the second flour stream are deactivated, thereby increasing the stability and refrigerated shelf life of the packaged raw dough composition to at least 120 days. In certain embodiments, one or more enzymes are reintroduced into the second flour stream.

32 Claims, 2 Drawing Sheets

(51) Int. Cl.
  *A21D 6/00*    (2006.01)
  *A21D 15/02*   (2006.01)
  *A21D 2/00*    (2006.01)
  *A21D 2/18*    (2006.01)
  *A21D 10/02*   (2006.01)

(52) U.S. Cl.
  CPC .......... *A21D 6/003* (2013.01); *A21D 10/025* (2013.01); *A21D 15/02* (2013.01)

(56) References Cited

U.S. PATENT DOCUMENTS

| | | |
|---|---|---|
| 4,299,848 A | 11/1981 | De Stefanis et al. |
| 5,376,390 A | 12/1994 | Hammond |
| 6,372,281 B1 | 4/2002 | Metzger et al. |
| 6,495,191 B1 | 12/2002 | Maldonado |
| 7,258,888 B2 | 8/2007 | Dreese et al. |
| 7,425,344 B2 | 9/2008 | Korolchuk et al. |
| 8,017,172 B2 | 9/2011 | Arndt et al. |
| 8,133,527 B2 | 3/2012 | Haynes et al. |
| 8,173,193 B2 | 5/2012 | Haynes et al. |
| 8,221,810 B2 | 7/2012 | Allen et al. |
| 8,252,360 B2 | 8/2012 | Arndt et al. |
| 8,404,298 B2 | 3/2013 | Arndt et al. |
| 8,455,036 B2 | 6/2013 | Haynes et al. |
| 8,455,037 B2 | 6/2013 | Haynes et al. |
| 8,821,954 B2 | 9/2014 | Castillo Rodriguez et al. |
| 8,852,665 B2 | 10/2014 | Arndt et al. |
| 2006/0073258 A1 | 4/2006 | Korolchuk |
| 2006/0286269 A1 | 12/2006 | Shah et al. |
| 2007/0259091 A1 | 11/2007 | Dreese et al. |
| 2007/0269579 A1 | 11/2007 | Mingus et al. |
| 2007/0298143 A1 | 12/2007 | John |
| 2008/0131582 A1* | 6/2008 | Karwowski ............ A23L 7/197 426/622 |
| 2008/0152781 A1 | 6/2008 | Dreese |
| 2014/0227407 A1 | 8/2014 | Sun et al. |
| 2015/0004301 A1 | 1/2015 | Arndt et al. |

\* cited by examiner

REFRIGERATED DOUGH WITH EXTENDED SHELF LIFE MADE FROM WHITE WHEAT FLOUR

BACKGROUND OF THE INVENTION

The invention relates to producing white wheat flour and a raw dough, having an extended refrigerated shelf life, made from the white wheat flour. More specifically, the invention involves heat treating a milled, high ash grain stream to deactive enzymes in the high ash stream and combining the heat treated high ash stream with one or more other non-heat treated streams in forming a combined white wheat flour used to make a raw dough exhibiting the extended refrigerated shelf life.

Refrigerated dough products are popular with consumer and commercial users due to their ease of use and ability to maintain freshness during considerable periods of refrigerated storage, e.g., conventionally up to 90 days. Still, it is a continuing goal in this field to improve the potential storage period of refrigerated dough products, while maintaining the quality or stability of the dough.

For some types of dough products and dough product ingredients, storage stability can be more difficult than for others. An example of a class of dough product that can be particularly difficult to store for extended periods of time is white flour doughs made from wheat grains. At the same time, white flour dough products made from wheat grains are often specifically desired by consumers such that a refrigerated raw dough made from wheat grains which exhibits extended refrigerated storage stability would be quite desirable to consumers.

The difficulty in storing wheat doughs, as well as wheat flours and other wheat food products, is mainly due to enzymes that are naturally present in wheat grain and can cause spoilage. Enzymes are significantly more concentrated in the wheat germ and wheat bran portions of a kernel, and are less concentrated in the much larger endosperm. More particularly, when the wheat grains are milled, various streams are formed. The enzymes are particularly prevalent in the bran and germ streams which are typically utilized in making whole wheat but not "white" flours. Therefore, in connection with white flours or doughs made therefrom, generally only low or medium ash/bran streams from the endosperm are employed such that enzyme levels are inherently low. Of course, as only a reduced number of streams are utilized, the amount of white flour which can be produced from a given quantity of wheat grains is reduced and the resulting product does not include potentially beneficial attributes which would come from the use of other milled streams. Processes for preparing whole-wheat flours, on the other hand, retain the germ and bran, as well as the relatively high concentrations of enzymes. These enzymes become part of a finished whole-wheat flour, or a dough or other food product made from the whole-wheat flour.

Because many consumers specifically desire non-whole wheat food products, including food products made from raw refrigerated white flour dough, it would be desirable to enable an additional stream from the milled wheat grains to be employed in connection with making non-whole wheat or white flours and, more preferably, a refrigerated dough product from the white flour. It would be further desirable to enable the produced dough to retain its freshness for extended periods of refrigerated storage.

SUMMARY OF THE INVENTION

The present invention is directed to making a white wheat flour, particularly for use in making a refrigerated dough product, from separately processed streams produced in the milling of wheat grains. More particularly, the invention is directed to making the white flour from a combination of a first flour stream including at least a non-heat treated low ash and low bran flour stream, and a heat treated second flour stream, herein referred to as a heat-treated high ash and high bran flour stream due to the comparatively higher ash and bran levels versus the first flour stream. The invention is also concerned with producing a raw dough composition from the white flour, wherein the raw dough composition can be packaged and stored in a refrigerated condition for subsequent use in making biscuits, rolls, croissants or the like. By heating the second flour stream, enzymes in the second flour stream are preferably fully, but at least partially, deactivated, which has been found to increase the stability and refrigerated shelf life of the packaged raw dough composition to at least 120 days.

In accordance with the invention, wheat grains are milled into multiple product streams, such as a low ash stream, a medium ash stream, a high ash stream, a combination of shorts and mids, the bran and the germ. The high ash stream is also high in bran and, correspondingly, contains a significant amount of enzymes. This high ash stream, also referred to as "clears", is individually heat treated in order to deactivate these enzymes. Thereafter, the heat treated high ash stream is combined with the low and medium ash streams produced from the endosperm of the wheat grains to establish a combined white flour. This white flour can then be employed in making a raw dough which, based on the deactivation of the enzymes, will have an enhanced refrigerated shelf life. In accordance with another aspect of the invention, at least one enzyme can be reintroduced into the heat treated high ash stream. In a particular embodiment, enzymes, including both alpha and beta amylase, are added to the heat treated high ash stream.

Based on the above, the invention involves the processing of multiple milled wheat grain constituents including portions that include deactive enzymes. The heat treatment can be performed in varies ways, such by exposure to heat in the form of steam. In any case, additional objects, features and advantages of the invention will become more readily apparent from the following detailed description of the invention, particularly with reference to the drawing.

DETAILED DESCRIPTION OF THE INVENTION

Figure 1:
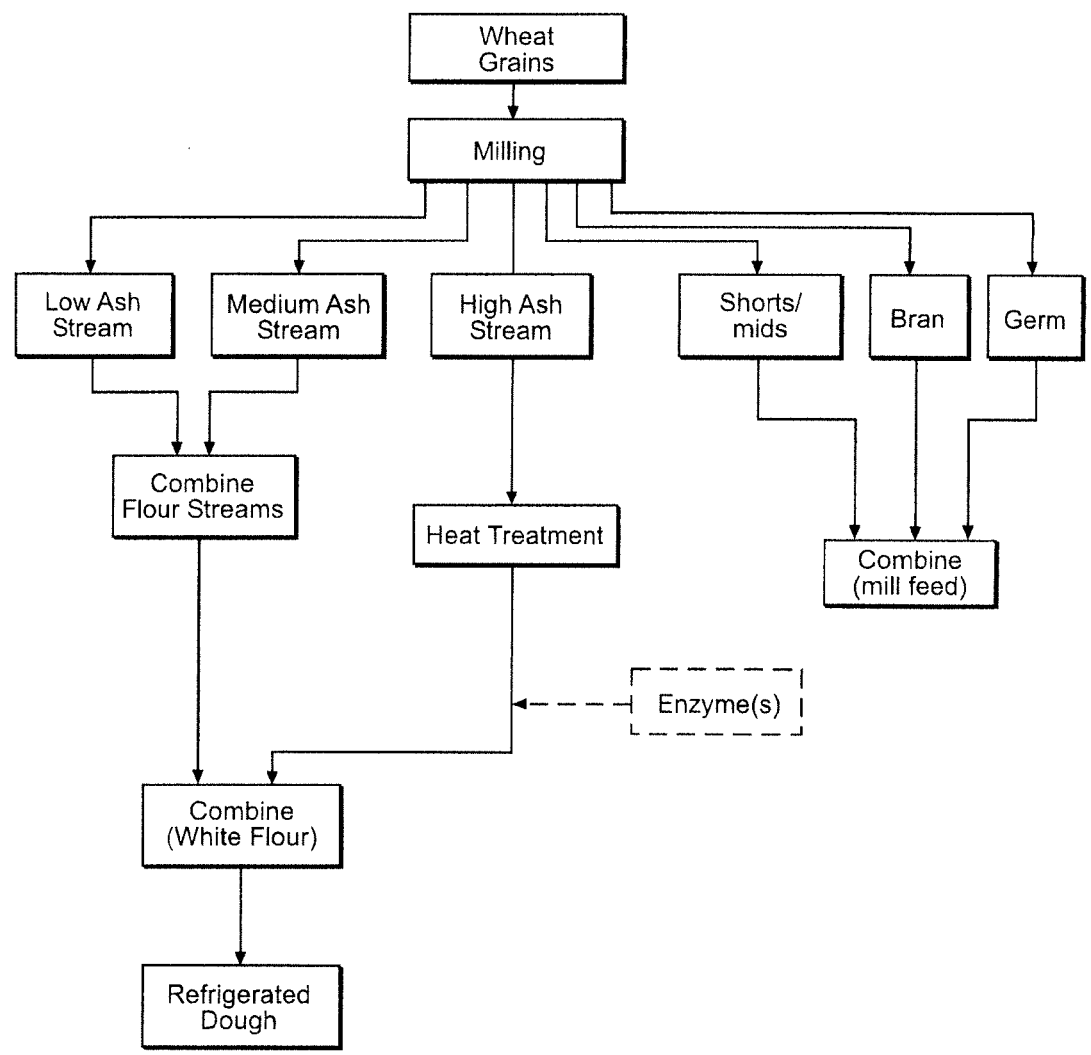
FIG. 1 is a flow-diagram that illustrates an exemplary process according to the invention.

With general reference to FIG. 1, the invention involves forming white flour from multiple milled grain streams, wherein one of the streams is individually heat treated to at least partially, but preferably fully, deactivate enzymes found in the stream prior to combining the multiple streams. Any type of wheat grain, or combinations of one or more wheat grain, can be used, as desired, including high or low protein content wheat grains. The particular grain or combination of grains can be selected based on a variety of factors, e.g., relating to the desired product to be produced, economics, availability, and the like. Non-limiting examples of types of wheat grains include Common Wheat, (*Triticum vulgare*), Durum Wheat (*T. durum*) and Club Wheat (*T. compactum*).

The wheat grain can have a moisture content over a large range depending on the stage of processing, atmosphere, etc. In general, the moisture content of harvested wheat grain is below about 16 percent. Stored wheat grain may have a moisture content of below 15, e.g., in the range from about 10 to about 12 percent. At dry conditions, wheat grain may have a moisture content below this range, e.g., from 6 to 8 percent. If tempered prior to milling, wheat grain may have a moisture content of approximately 14 to 16 percent.

As depicted, the wheat grains are initially milled. Processes for milling the wheat grain that will be useful according to the invention are commonly known and practiced. In particular, the wheat grain can be processed by milling steps that may include one or more of bran removal such as pearling, pearling to remove germ, other forms of abrading, grinding, sizing, tempering, etc. Often, wheat grain is milled to produce a flour portion that is substantially endosperm and a bran portion that contains substantially the balance of the wheat grain components, which will include a substantial majority of wheat germ and wheat bran. That is, the starchy endosperm typically accounts for up 85 weight percent of the wheat grain. Therefore, the endosperm is a major constituent of a wheat flour. The endosperm contains relatively lower amounts of enzymes than do the wheat bran and wheat germ.

Regardless of the particular milling operation(s) performed, the wheat grains are preferably milled into a low ash stream, a medium ash stream, a high ash stream or "clears", shorts/mids, bran and germ. By way of example, by weight percentages, each of the low ash (<0.35) stream, the medium ash (<0.50) and the high ash (>0.50) stream constitutes between 20-40%, while the shorts/mids range from 10-25%, the bran from 15-20% and the germ 2-5%. As shown, the shorts/mids, bran and germ are combined to form mill feed which is not utilized in making the white flour or raw refrigerated dough in accordance with the invention. Instead, the low ash stream and the medium ash stream are initially combined to produce a first combined flour stream.

The high ash stream also includes a high bran content and, accordingly, a significant amount of enzymes. As these enzymes can contribute to the early spoilage of dough produced with this mill stream, the high ash stream is separately heat treated so as to deactivate the enzymes which can include peroxidase, xylanase, protease, amylase, polyphenyl oxidase, phosphatase, lipase, invertase, and liposygenase. The treatment to deactivate the enzymes can actually include any form of treatment that can result in reduction in the overall content of active enzymes, with methods of deactivating enzymes in food products and food ingredients being generally known. The skilled artisan, with an understanding of such methods, and based additionally on the present description, will appreciate how methods for deactivating enzymes can be useful to deactivate enzymes contained in the high ash stream. Presently useful methods can involve the use of heat treatment, including heat treatment by contact with steam, which can involve exposing the high ash stream to conditions of heat or steam for a desired amount of time, at a useful temperature, optionally while the high ash material includes a desired or effective amount of moisture. Steam, if used, can be standard steam at a desired pressure, or superheated steam, as desired. The combination of temperature, timing, agitation, and internal and external moisture, as well as other factors of a useful process, can be effective to deactivate amounts of enzymes contained in a high ash stream. In certain embodiments, at least 95 percent, of the total enzymes contained in the entire high ash stream are deactivated.

According to embodiments wherein the material is exposed to steam, the temperature of the steam and the amount of steam (relative to the amount of material being treated) can be selected and controlled to provide a desired amount of energy to deactivate the enzymes. A useful amount of steam can depend on factors such as the type of material being treated; the temperature of the steam; the amount and type of enzyme initially contained in the material being treated; the moisture content of the material being treated; the size of material particles; etc. A general exemplary range of useful amounts of steam (at 1 atmosphere, 212 F), for exposure times in the range from a fraction of a second to an hour, can be amounts in the range from 0.05 to 0.5 pound of steam per pound of material being treated (e.g., high ash portion of milled wheat grains), e.g., from 0.05 to 0.2 pounds steam per pound of the wheat material.

In the first flour stream, there will be a substantial amount of endosperm, which includes high amounts of materials that have desired nutritional and dough performance functional value, including proteins (e.g., gluten), starches, etc. As this first flour stream is not heat treated to any extent necessary to deactivate enzymes (herein referred to as "non-heat treated"), these proteins and starches will advantageously not be damage, e.g., denatured or otherwise inactivated. According to the invention, the high ash stream that has been treated to inactivate enzymes, as discussed, is combined with the low ash and medium ash streams to produce a combined, white flour. In turn, the white flour is used to produce a dough which, at least in certain embodiments, is designed to be packaged as a refrigerated dough. Overall, the dough can be designed to be leavened by the action of yeast or by the action of a chemical leavening system. In a particular embodiment of the invention, the refrigerated dough is formed into pucks or discs, with a plurality of the pucks being stacked and packaged wherein the pucks can be later baked into biscuits. In other embodiments, the dough is sheeted and rolled, packaged and refrigerated for later producing dinner rolls or croissants. Such dough products can be prepared according to methods and using ingredients that are well understood in the dough and baking arts, but with the white flour ingredient described herein. In general, such dough compositions can be prepared from ingredients generally known in the dough and breadmaking arts, typically including flour, a liquid component such as oil or water, yeast or a chemical leavening system, fat (solid or liquid), and optionally additional ingredients such as salt, sweeteners, dairy products, egg products, processing aids, emulsifiers, particulates, dough conditioners, one or more flavorants, and the like. In addition, one or more gums, such as xanthan gum, can also be added to retain water and preserve a desired height/spread aspect ratio in the final products. In each case, with the enzymes being deactivated, these flours and dough products exhibit improved stability and refrigerated shelf lives compared to similar products prepared from white flour that has not been treated as presently described. For specifically, the dough products of the invention have exhibited refrigerated shelf lives of at least 120 days, more specifically even 150 days, approximately a 33-67% increase over conventional, corresponding refrigerated dough products.

In accordance with another aspect of the invention, one or more enzymes can be re-introduced into the heat treated high ash stream, such as prior to forming the combined, white flour. In a particularly preferred embodiment of the invention, amylase is re-introduced, specifically both alpha and beta amylase which have been found to be beneficial to the product while not leading to early spoilage. Even if one or more enzymes are added back into the high ash stream, the produced flour according to the invention will contain reduced amounts of originally present active enzymes. More specifically, the flour of the invention will have a majority of deactivated enzymes compared to the amount of enzymes present in the natural wheat grain constituents.

Based on the above, it should be readily apparent that specific streams from the milling of wheat grains are combined in forming a white flour, including a high ash stream which has been separately treated to deactivate enzymes that could lead to premature loss of freshness and stability of dough prepared from the white flour. One or more beneficial enzymes, from the list of enzymes which were deactivated or are not present in any significant amounts, can be added back into the high ash stream, prior to the high ash stream being combined with one or more low and medium ash streams to form the white flour of the invention. In addition to the extended refrigerated shelf life, the dough of the invention has been found to exhibit a 10% increase in bake specific volume over corresponding, conventional refrigerated doughs. As the low and medium ash streams are not subjected to the same treatment, the protein/gluten quality of the flour/dough is maintained. Without the detrimental enzymes, a significant reduction in the loss of sucrose, specifically the hydrolysis of sucrose to glucose and fructose over shelf life time, has been found as these enzymes tended to breakdown this sugar, resulting in undesirably darker products upon cooking.

Figure 2:
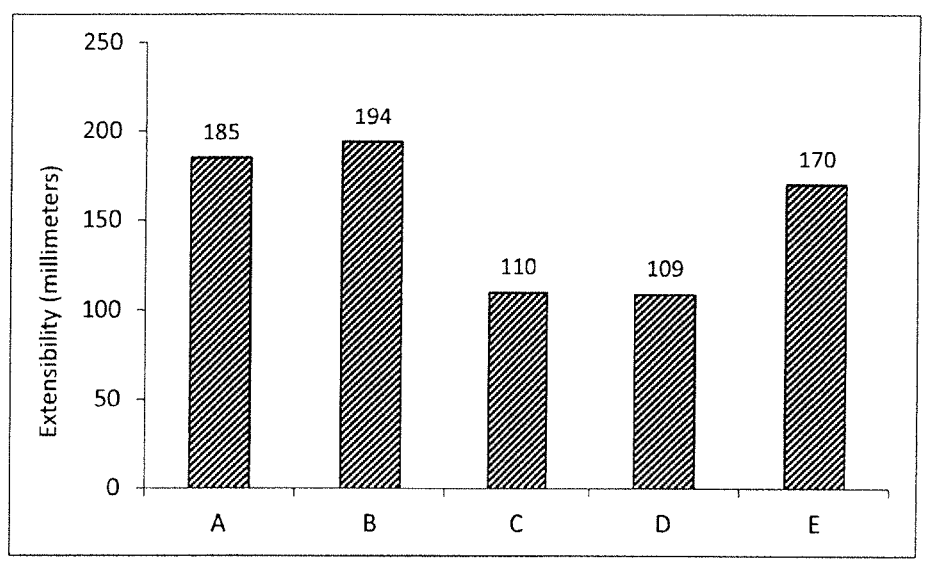
FIG. 2 is a bar graph showing the extensibility associated with various different flours.

In connection with producing dough employing the flour established in accordance with the invention, it is important that the flour exhibit an acceptable extensibility. More specifically, extensibility is known to correlate with processability on sheeted dough manufacturing systems. To this end, the American Association of Cereal Chemists have established an approved method (54-10.01) for measuring extensibility utilizing a Brabender Extensograph and applying a 45 minute proving time. FIG. 2 illustrates the measured extensibility of five flours, all measured in the same fashion using this approved method. Flour A was a 0.40% Ash flour, having a low enzyme content due to the absence of high ash clears. Flour A exhibited an extensibility of 185 mm, thereby representing a dough which is substantially processable on a sheeted dough manufacturing system. However, this dough has a quite high increased cost per unit weight, particularly due to the low flour output as a ratio of the wheat input at the mill. Flour B was a 0.55% Ash flour created by the addition of 18% high ash clears to Flour A. With an extensibility of 194 mm, Flour B is also substantially processable on a sheeted dough manufacturing system. However, Flour B has a high enzyme content due to the presence of the high ash clears. Flour C is the same as Flour A, but subjected to a heat treatment process to deactivate enzymes which resulted in a decrease in the extensibility to a point below reasonable processability on a sheeted dough manufacturing system. Flour D is the same as Flour B, but subjected to a heat treatment process as Flour C to reduce its enzyme content. Again, the extensibility was decreased to a level preventing processability on a sheeted dough manufacturing system. Finally, Flour E was a 0.55% Ash flour created by the addition of 18% high ash clears to Flour A with only the high ash clears being subjected to the same heat treatment as Flours C and D for enzyme reduction in accordance with the invention. As clearly shown, extensibility was reasonably maintained for Flour E such that Flour E can be effectively used to produce a processable dough for a sheeted dough manufacturing system. In addition, Flour E advantageously has a substantially lower cost per unit weight as compared to Flour A, basically due to having an equivalent flour output as a ratio of wheat input at the mill as Flour B. As indicated, Flour E was measured to have an extensibility of 170 mm. Based on overall testing, a reasonably maintained extensibility would be in the range of 160-180 mm, with about 170 mm (i.e., 170±5 mm) being preferred.

At this point, it must be recognized that the extensibility of wheat crops, and hence the ability of flour produced therefrom, will vary from year to year. In fact, the extensibility can even vary significantly between samples of the crops of the same year. For instance, using the standardize test referenced above, the extensibility of wheat flour from 2013 and 2014 spring and winter crops varied from just under 260 to under 100. It is reasonable to say that 120 can be used as a lower cut-off for a substantially processable flour. With this in mind, for purposes of the invention, it is important to really look at the change in extensibility between the white wheat flour resulting from the specified heat-treating of the invention versus a base flour made without distinct heat-treating of flour streams. In accordance with the invention, by only heat-treating the high ash and high bran flour stream, the overall extensibility is not significantly changed from a corresponding base flour. More specifically, in accordance with the invention, the extensibility is controlled to not vary by more than 20%, preferably less than 10% and, most preferably less than 5%, thereby assuring that the processability of the flour will be maintained.

Overall, the invention is seen to set forth a rather surgical approach to establishing a stabilized dough by reducing wheat flour enzyme activity through the isolation of lower extraction flour (less aleurone and bran content) from a high enzymatic outer layer clears stream and then separately treating the high enzymatic clears stream prior to combining this stream with the lower extraction flour. In any case, although described with reference to preferred embodiments, it should be understood that various changes and/or modifications can be made to the invention without departing from the spirit thereof.

The invention claimed is:

1. A white wheat flour comprising a combination of a first flour stream including a non-heat treated low ash and low bran flour stream, and a second flour stream including a heat-treated high ash and high bran stream, wherein enzymes in the second flour stream are deactive, wherein the white wheat flour excludes a bran stream and excludes a germ stream.

2. The white wheat flour of claim 1, wherein the first flour stream further includes a non-heat treated medium ash flour stream.

3. The white wheat flour of claim 1, further comprising at least one active enzyme in the second flour stream.

4. The white wheat flour of claim 3, wherein the at least one active enzyme is amylase.

5. The white wheat flour of claim 4, wherein the at least one active enzyme includes both alpha and beta amylase.

6. The white wheat flour of claim 1, wherein an extensibility of the white wheat flour does not vary by more than 20% from an extensibility of a white wheat flour made without distinct heat-treating of the first and second flour streams.

7. The white wheat flour of claim 6, wherein the extensibility of the white wheat flour does not vary by more than 10%.

8. The white wheat flour of claim 1, wherein the white wheat flour has an extensibility in the range of 160-180.

9. A dough composition made from the white wheat flour according to claim 1.

10. The dough composition of claim 9, further comprising a gum.

11. A refrigerated package comprising a raw dough composition formed from a white wheat flour established by a combination of a first flour stream including a non-heat treated low ash and low bran flour stream, and a second flour stream including a heat-treated high ash and high bran stream, wherein enzymes in the second flour stream are deactive, wherein the white wheat flour excludes a bran stream and excludes a germ stream.

12. The refrigerated package of claim 11, wherein the first flour stream of the raw dough composition further includes a non-heat treated medium ash flour.

13. The refrigerated package of claim 11, further comprising at least one active enzyme from the second flour stream.

14. The refrigerated package of claim 13, wherein the at least one active enzyme is amylase.

15. The refrigerated package of claim 14, wherein the at least one active enzyme is both alpha and beta amylase.

16. The refrigerated package of claim 11, wherein the raw dough composition further comprises a gum.

17. The refrigerated package of claim 11, wherein the dough composition has a refrigerated shelf life of at least 120 days.

18. The refrigerated package of claim 11, wherein the raw dough composition is in the form of a plurality of stacked biscuit pucks.

19. The refrigerated package of claim 11, wherein the white wheat flour has an extensibility which does not vary by more than 20% from an extensibility of a white wheat flour made without distinct heat-treating of the first and second flour streams.

20. The refrigerated package of claim 19, wherein the extensibility does not vary by more than 10%.

21. The refrigerated package of claim 11, wherein the white wheat flour has an extensibility in the range of 160-180.

22. A method of making a raw dough composition package having an extended refrigerated shelf life comprising:
   milling wheat grains into multiple product streams, including a low ash and low bran stream, a high ash and high bran stream, a bran stream and a germ stream;
   heat treating the high ash and high bran stream to deactivate enzymes in the high ash and high bran stream, while not subjecting the low ash and low bran stream to heat treatment;
   combining the non-heat treated first low ash and low bran stream with the heat-treated high ash and high bran stream, without the bran stream or the germ stream, to form a combined white flour;
   forming a raw dough composition from the combined white flour; and
   packaging the raw dough composition, wherein the raw dough composition has a refrigerated shelf life of at least 120 days.

23. The method of claim 22, further comprising: combining a medium ash stream with the non-heat treated first low ash and low bran stream and the high ash and high bran stream.

24. The method of claim 22, further comprising: adding at least one active enzyme back into the high ash and high bran stream after heat treating the high ash and high bran stream.

25. The method of claim 24, wherein the at least one active enzyme is amylase.

26. The method of claim 25, wherein the at least one active enzyme is both alpha and beta amylase.

27. The method of claim 22, further comprising: adding a gum to the combined flour in forming the raw dough composition.

28. The method of claim 22, wherein the white wheat flour has an extensibility which does not vary by more than 20% from an extensibility of a white wheat flour made without distinct heat-treating of the high ash and high bran stream and the low ash and low bran stream.

29. The method of claim 28, wherein the extensibility does not vary by more than 10%.

30. The method of claim 22, wherein the white wheat flour has an extensibility in the range of 160-180.

31. The white wheat flour of claim 1, wherein the white wheat flour consists of the combination of the first flour stream consisting of a non-heat treated low ash and low bran flour stream, and the second flour stream consisting of a heat-treated high ash and high bran stream.

32. The refrigerated package of claim 11, wherein the white wheat flour consists of the combination of the first flour stream consisting of a non-heat treated low ash and low bran flour stream, and the second flour stream consisting of a heat-treated high ash and high bran stream.

* * * * *